United States Patent
Goldenberg

(10) Patent No.: US 12,458,364 B2
(45) Date of Patent: Nov. 4, 2025

(54) TOOL FOR HEMOSTASIS AND TISSUE APPROXIMATION

(71) Applicant: CEDARS-SINAI MEDICAL CENTER, Los Angeles, CA (US)

(72) Inventor: David Goldenberg, Los Angeles, CA (US)

(73) Assignee: Cedars-Sinai Medical Center, Los Angeles, CA (US)

( * ) Notice: Subject to any disclaimer, the term of this patent is extended or adjusted under 35 U.S.C. 154(b) by 716 days.

(21) Appl. No.: 17/285,192

(22) PCT Filed: Nov. 4, 2019

(86) PCT No.: PCT/US2019/059702
§ 371 (c)(1),
(2) Date: Apr. 14, 2021

(87) PCT Pub. No.: WO2020/096981
PCT Pub. Date: May 14, 2020

(65) Prior Publication Data
US 2021/0378675 A1 Dec. 9, 2021

Related U.S. Application Data

(60) Provisional application No. 62/757,646, filed on Nov. 8, 2018.

(51) Int. Cl.
*A61B 17/128* (2006.01)
*A61B 1/018* (2006.01)
(Continued)

(52) U.S. Cl.
CPC .......... *A61B 17/1285* (2013.01); *A61B 1/018* (2013.01); *A61B 17/1227* (2013.01); *A61B 2017/12004* (2013.01)

(58) Field of Classification Search
CPC . A61B 17/1285; A61B 1/018; A61B 17/1227; A61B 2017/12004;
(Continued)

(56) References Cited

U.S. PATENT DOCUMENTS 1,025,362 A * 5/1912 Beuoy .................... A61B 17/30
600/218
2,622,300 A * 12/1952 Marziani ................ A47H 13/01
24/326
(Continued)

FOREIGN PATENT DOCUMENTS

CN 104173090 A 12/2014
EP 4146092 3/2023
(Continued)

OTHER PUBLICATIONS

EP Search Report for EP 19881966.6 dated Jul. 19, 2022, 25 pages.
(Continued)

*Primary Examiner* — Tan-Uyen T Ho
*Assistant Examiner* — Osama Nemer
(74) *Attorney, Agent, or Firm* — Nixon Peabody LLP

(57) ABSTRACT

Disclosed are systems and methods for safely and effectively deploying a hemoclip onto a patient's desired target using a combined hemoclip and endoscopic system. For instance, disclosed is an endoscope that includes a lumen for a hemoclip of the present disclosure to pass through. Additionally, disclosed are hemoclips that are configured to be in a compressed position until the hemoclip is deployed out of an endoscope where it opens into an X-shape. Then, the hemoclip may be clipped onto the target to encapsulate the desired target within the patient. Once the hemoclip is clamped onto the target, the endoscope can move onto the next target for successive deployment and utilization of the hemoclips without manual reload.

21 Claims, 6 Drawing Sheets

(51) Int. Cl.
*A61B 17/12* (2006.01)
*A61B 17/122* (2006.01)

(58) Field of Classification Search
CPC ...... A61B 2017/00951; A61B 1/00087; A61B 1/00098; A61B 17/10; A61B 17/128; A61B 17/0469; A61B 17/068; A61B 17/08; A61B 17/105; A61B 2017/00867
See application file for complete search history.

(56) References Cited

U.S. PATENT DOCUMENTS

| | | | | |
|---|---|---|---|---|
| 2,667,678 | A * | 2/1954 | Hargrave | B42F 1/006 D24/143 |
| 3,779,108 | A * | 12/1973 | Reiter | B25B 5/06 81/424 |
| 3,854,482 | A * | 12/1974 | Laugherty | A61B 17/122 292/322 |
| 3,958,576 | A * | 5/1976 | Komiya | A61B 17/10 24/537 |
| 4,360,023 | A * | 11/1982 | Sugita | A61B 17/1227 606/158 |
| 4,390,019 | A * | 6/1983 | LeVeen | A61B 17/122 606/158 |
| 4,556,060 | A * | 12/1985 | Perlin | A61B 17/1227 24/552 |
| 4,612,932 | A * | 9/1986 | Caspar | A61B 17/0682 606/143 |
| 4,637,395 | A * | 1/1987 | Caspar | A61B 17/083 606/143 |
| 4,791,707 | A * | 12/1988 | Tucker | A61B 17/128 227/19 |
| 4,815,466 | A * | 3/1989 | Perlin | A61B 17/1227 251/10 |
| 4,902,078 | A * | 2/1990 | Judd | G06F 1/1611 24/67.5 |
| 4,919,152 | A * | 4/1990 | Ger | A61B 17/29 128/898 |
| 4,932,955 | A * | 6/1990 | Merz | A61B 17/1227 606/158 |
| 5,022,126 | A * | 6/1991 | Davis | A61B 50/20 24/543 |
| 5,159,730 | A * | 11/1992 | Radvin | A47G 25/485 24/543 |
| 5,640,742 | A * | 6/1997 | White | A44C 3/001 24/3.12 |
| 5,725,542 | A * | 3/1998 | Yoon | A61B 17/12 606/151 |
| 5,862,815 | A * | 1/1999 | Murphy | A45D 8/20 132/277 |
| 5,983,459 | A * | 11/1999 | Goldenberg | A45F 5/022 24/336 |
| 6,179,850 | B1 * | 1/2001 | Goradia | A61B 17/1227 606/158 |
| 6,468,285 | B1 * | 10/2002 | Hsu | A61B 17/062 606/158 |
| 7,766,313 | B2 * | 8/2010 | Panosian | B25B 5/06 269/95 |
| 9,532,786 | B2 * | 1/2017 | Guzman Sanchez | A61B 17/1227 |
| 9,795,390 | B2 | 10/2017 | Jin et al. | |
| 9,861,365 | B2 * | 1/2018 | Zieris | A61B 17/1227 |
| 10,039,565 | B2 * | 8/2018 | Vezzu | A61B 17/285 |
| 10,105,141 | B2 * | 10/2018 | Harris | A61B 17/083 |
| 10,537,327 | B2 * | 1/2020 | Park | A61B 17/083 |
| 10,610,234 | B2 * | 4/2020 | Xu | A61B 18/1482 |
| 10,631,868 | B2 * | 4/2020 | Ad | A61B 17/1285 |
| 10,639,044 | B2 * | 5/2020 | Prior | A61B 17/1222 |
| 10,952,742 | B2 * | 3/2021 | Lehtinen | A61B 90/03 |
| 11,648,014 | B2 * | 5/2023 | Foshee | A61B 17/122 606/151 |
| 11,660,097 | B2 * | 5/2023 | Roundy | A61B 17/122 606/143 |
| 11,748,581 | B2 * | 9/2023 | Harris | G06K 13/0806 235/486 |
| 11,911,042 | B2 * | 2/2024 | Winkler | A61B 17/122 |
| 2002/0115964 | A1 | 8/2002 | Boudreaux | |
| 2005/0107809 | A1 | 5/2005 | Litscher et al. | |
| 2005/0119677 | A1 * | 6/2005 | Shipp | A61B 17/1285 606/139 |
| 2005/0216036 | A1 * | 9/2005 | Nakao | A61B 17/083 606/139 |
| 2005/0245862 | A1 | 11/2005 | Seward et al. | |
| 2006/0100646 | A1 * | 5/2006 | Hart | A61B 17/083 606/151 |
| 2006/0224170 | A1 * | 10/2006 | Duff | A61B 17/1227 606/157 |
| 2007/0265640 | A1 * | 11/2007 | Kortenbach | A61B 10/06 606/139 |
| 2008/0039879 | A1 * | 2/2008 | Chin | A61B 17/064 606/157 |
| 2008/0097398 | A1 | 4/2008 | Mitelberg et al. | |
| 2008/0243178 | A1 * | 10/2008 | Oren | A61B 17/0483 606/210 |
| 2011/0190791 | A1 | 8/2011 | Jacobs et al. | |
| 2012/0179171 | A1 | 7/2012 | Cohen et al. | |
| 2014/0114332 | A1 * | 4/2014 | Lutze | A61B 17/1227 606/151 |
| 2014/0249551 | A1 | 9/2014 | Adams et al. | |
| 2015/0088173 | A1 * | 3/2015 | Guzman Sanchez | A61B 17/42 606/158 |
| 2015/0112367 | A1 | 4/2015 | Damarati | |
| 2015/0272588 | A1 | 10/2015 | Khan | |
| 2016/0000433 | A1 | 1/2016 | Raybin et al. | |
| 2018/0132855 | A1 | 5/2018 | Xu | |
| 2018/0344323 | A1 | 12/2018 | Shi | |
| 2019/0133598 | A1 | 5/2019 | Uesaka et al. | |
| 2020/0113573 | A1 | 4/2020 | Shi | |
| 2020/0146685 | A1 | 5/2020 | Jin et al. | |
| 2023/0172616 | A1 * | 6/2023 | Goldenberg | A61B 17/083 606/142 |

FOREIGN PATENT DOCUMENTS

| | | |
|---|---|---|
| KR | 101826446 B1 | 2/2018 |
| WO | 2018228020 A1 | 12/2018 |
| WO | 2020096981 A1 | 5/2020 |
| WO | 2021226400 A1 | 11/2021 |

OTHER PUBLICATIONS

PCT Search Report and Written Opinion for PCT/US2021/031185 dated Oct. 7, 2021, 11 pages.
ISR/WO for PCT/US2019/059702 dated Jan. 21, 2020, 8 pages.
European Search Report for EP 4146092 dated May 2, 2024 16 pages.
Extended European Search Report for EP 4146092 dated Jul. 23, 2024, 14 pages.

* cited by examiner

TOOL FOR HEMOSTASIS AND TISSUE APPROXIMATION

CROSS-REFERENCE TO RELATED APPLICATIONS

This application is the national phase of International Application No. PCT/US2019/059702, filed Nov. 4, 2019, which designated the U.S. and that International Application was published under PCT Article 21(2) in English. This application claims priority under 35 U.S.C. § 119 to U.S. Provisional Application No. 62/757,646 filed Nov. 8, 2018, the contents of which are incorporated herein by reference in its entirety.

FIELD OF THE DISCLOSURE

The present disclosure relates to systems and methods for deploying hemoclips.

BACKGROUND OF THE DISCLOSURE

The following description includes information that may be useful in understanding the present disclosure, it is not an admission that any of the information provided herein is prior art or relevant to the present disclosure, or that any publication specifically or implicitly referenced is prior art.

An endoscopic procedure to treat body lumens is a common procedure to diagnose and treat gastrointestinal pathology occurring in the lumen of the GI tract. An endoscope is placed at a targeted location within the patient's body in order to facilitate access to the body ducts and lumens, and the like. Since the endoscope itself often cannot conduct a therapeutic procedure, the endoscope is equipped with a catheter, a lumen, or an internal channel so that various medical devices can be fitted through the endoscope to the treatment site within the patient's body.

An example of such medical devices is an endoscopic hemoclip device. The endoscopic hemoclips are primary means of permanent tissue approximation in the lumens of the gastrointestinal tract with a wide range of clinical applications. While initially developed to control intraluminal gastrointestinal bleeding during endoscopy, it has been further expanded for a variety of other clinical applications, including, but not limited to closing perforations, securing stents, controlling enteral feeding tubes position, marking lesions for x-ray imaging, and the like.

Hemoclips are deployed from the endoscope and are used to stop internal bleeding by clamping together the edges of a wound in vivo. The endoscopic hemoclip device includes clips attached to its distal end and are inserted through the endoscope's lumen, wherein the clip can be deployed at the treatment site to be clamped over the wound and detach from the device. Currently, hemoclips are metallic clips attached to a wire that runs through a plastic sheath. They are disposable devices that fire a single clip at a time and each clip can cost several hundred dollars. Further, each hemoclip must be loaded individually through a cumbersome and expensive process.

SUMMARY OF THE DISCLOSURE

The implementation of the presently disclosed devices and methods will result in better clinical results, more cost effective hemoclip deployments, and efficient patient care.

Accordingly, an endoscopic hemoclip device is disclosed that includes a mechanism for deploying multiple hemoclips in succession without reloading the hemoclip manually after a single use. The combination allows a physician to, effectively, seal a wound in vivo without removing and manually reloading the endoscopic hemoclip device each time a hemoclip is deployed.

BRIEF DESCRIPTION OF THE DRAWINGS

The accompanying drawings, which are incorporated in and constitute a part of this specification, exemplify the embodiments of the present disclosure and the description, serve to explain and illustrate principles of the disclosure. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
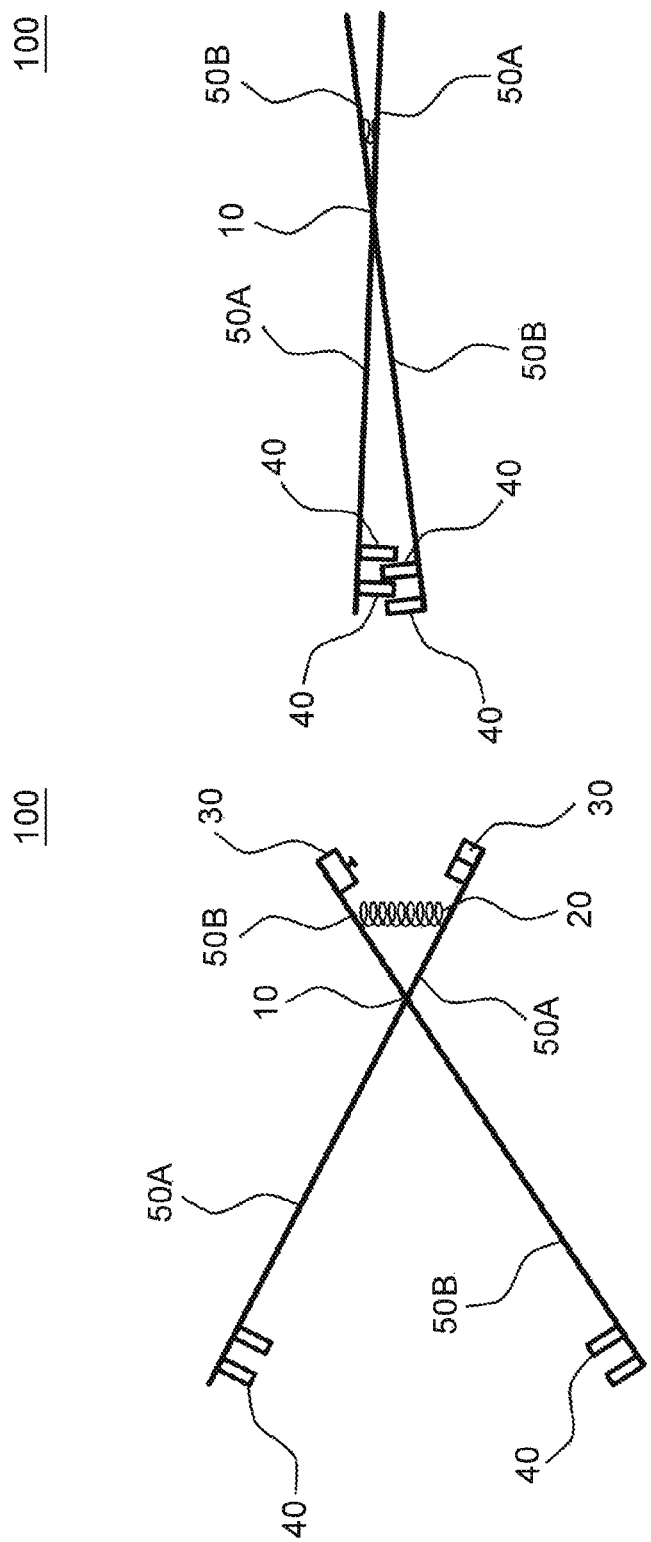
FIG. 1A illustrates an example of an endoscopic hemoclip that is deployed and in an open position in accordance with the principles of the present disclosure.
FIG. 1B illustrates an example of an endoscopic hemoclip that is not deployed and in a closed position in accordance with the principles of the present disclosure.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION OF THE PRESENT DISCLOSURE

Unless defined otherwise, technical and scientific terms used herein have the same meaning as commonly understood by one of ordinary skill in the art to which this disclosure belongs. Szycher's Dictionary of Medical Devices CRC Press, 1995, may provide useful guidance to many of the terms and phrases used herein. One skilled in the art will recognize many methods and materials similar or equivalent to those described herein, which could be used in the practice of the present disclosure. Indeed, the present disclosure is in no way limited to the methods and materials specifically described.

In some embodiments, properties such as dimensions, shapes, relative positions, and so forth, used to describe and claim certain embodiments of the disclosure are to be understood as being modified by the term "about."

Various examples of the disclosure will now be described. The following description provides specific details for a thorough understanding and enabling description of these examples. One skilled in the relevant art will understand, however, that the disclosure may be practiced without many of these details. Likewise, one skilled in the relevant art will also understand that the disclosure can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the disclosure. Indeed, certain terms may even be emphasized below; however, any terminology intended to be interpreted in any restricted manner will be overtly and specifically defined as such in this Detailed Description section.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Overview

Disclosed are systems and methods for safely and effectively deploying a hemoclip onto a target site within a patient using an endoscopic system. For instance, disclosed is an endoscope that includes a lumen for hemoclips to be stored and pass through before they are deployed. The endoscope may include a proximal end connected to a handle, and a distal end that is configured to enter the patient's body. The disclosed configuration of the endoscope for deploying hemoclips, results in an effective and efficient deployment of multiple hemoclips in succession within the patient's body.

The disclosed hemoclips are configured to be in a compressed position while traveling through the tunnel, channel, or lumen of the endoscope until the hemoclip is deployed out of an endoscope where it opens into an X-shape. Instead of the large, bulky clips that are presently available, the disclosed hemoclips have a pivot at the center which allows the hemoclip to collapse into a very narrow profile—smaller than the diameter of the working channel of the endoscope and then expand into a scissors like X shape with a spring or other suitable mechanism once the hemclip exits the channel from the distal end of the endoscope.

Thus, the hemoclip can be inserted into a channel of the endoscope, and will be collapsed until deployed from the endoscope and open into an X shape when the spring on the distal end pushes the clip to an "open" configuration when the tunnel is no longer confining the hemoclip in a compressed position (e.g. a closed scissors). Then, once the hemoclip has opened and partially exited the tunnel (but is still retained by the endoscope) the hemoclip may be clipped onto the target to encapsulate the desired target within the patient. Once a first hemoclip is clamped onto the target, the endoscope can move onto the next target for successive deployment and utilization of additional hemoclips that remain in the channel of the endoscope without manually reloading the endoscope.

Hemoclips

FIG. 1A illustrates an overview of an example of a hemoclip 100 that is deployed in an open position prior to clamping onto a desired target, such as, e.g., edges of a wound. The hemoclip 100 is configured in an X-shaped clip having a first jaw 50A and a second jaw 50B that are configured to be spread open in an open position as the hemoclip 100 is deployed from, e.g., an endoscope.

The first jaw 50A and the second jaw 50B are configured to intersect with one another as to form an X-shape with a pivot 10 in a center where the jaws intersect. The proximal portion of the jaws are configured to clamp onto a target site and a distal portion of the jaws are configured to snap shut and lock together to keep the proximal portion of the jaws clamped to the target sit. The pivot 10 may be any suitable pivot, including a joint with one axis of rotation, such as a simple bolt or other suitable methods.

In order to clamp down onto a target site, the hemoclip 100 includes a set of teeth 40 (or a claw) on each surface of first jaw 50A and the second jaw 50B on opposing sides from each other and facing each other inward. The set of teeth 40 are configured to lock onto a target with mechanical force, and the distal portion includes an adhesion or a clipping mechanism to keep the jaws locked shut.

The hemoclip 100 further includes a spring 20 located behind the pivot 10 towards the distal portion of the X-shaped clip which is configured to bias the jaws in an open position as the jaws are deployed out of the endoscope. This way, the jaws are automatically opened to encapsulate the target site as the X-shaped clip is being deployed prior to the jaws being closed onto the target.

In an alternative embodiment, instead of spring 20, the hemoclip 100 may include a piece of metal on its perimeter that would keep it closed at rest and a spring that forces the hemoclip 100 to open prior to deployment. The spring could be removed so that the jaws would close around the target site.

To clamp down onto the target site and keep the set of teeth 40 in a closed position as to hold onto the target, the first jaw 50A and the second jaw 50B each may include at least one securing latch 30 on opposing sides facing each other inward on the distal portion of the jaws. The at least one securing latch 30 may include various mechanical fasteners for clipping to pieces of metal together, for instance that lock when pressed together. For instance, the fastener may be a rod or screw on a distal portion of one of the jaws with angled portions that engage catches in a hole on a distal portion of the other jaw that faces the first jaw.

Alternatively, the at least one securing latches 30 may include any other mechanical means (e.g., a screw, locking mechanism, or others) or adhesive means (e.g., a biodegradable glue, a chemical adhesive, and the like) to close down onto each other. Once the securing latches 30 lock onto each other, it automatically closes both the distal and the proximal portions of the jaws so that the jaws can be closed onto the target site inside the patient while maintaining an X-shape.

Accordingly, as shown in, e.g., FIG. 1B, the hemoclip 100 remains in a compressed X-shape when it is not deployed from the endoscope because the sides of the tunnel confine it to the compressed shape. As shown, the set of teeth (or a staple) 40 may be configured to contain more than one tooth. Further, the spring 20 remains in a compressed position until it is deployed as shown in, e.g., FIG. 1A.

Endoscopes

Figure 2:
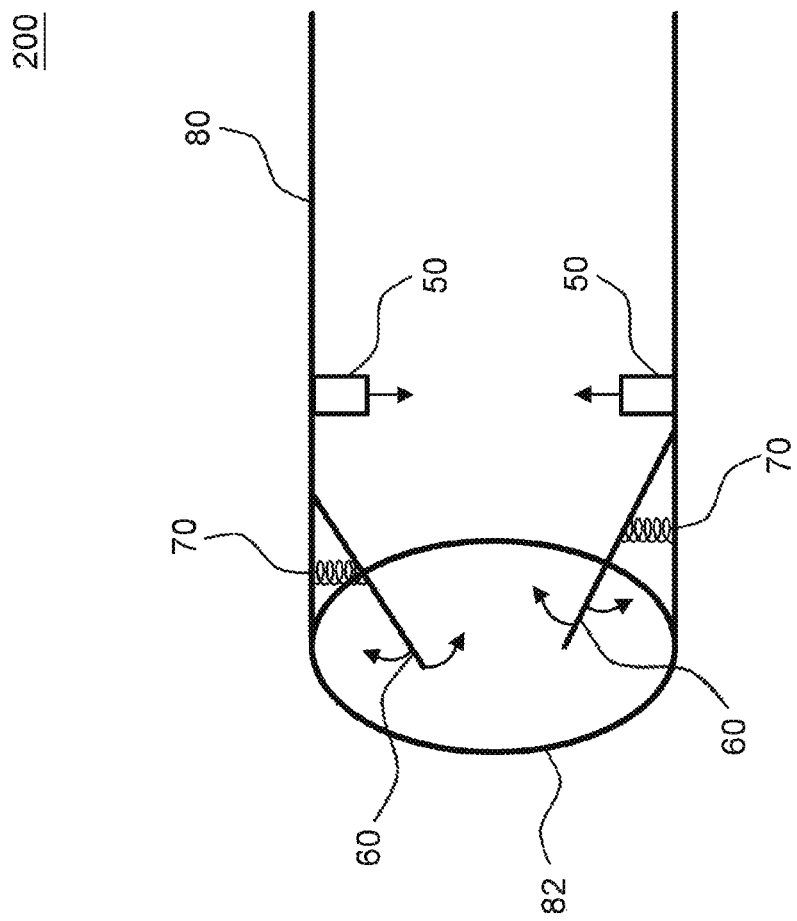
FIG. 2 illustrates an example of a distal end of a lumen of an endoscopic hemoclip device that is constructed in accordance with the principles of the present disclosure.

FIG. 2 illustrates an example of an endoscope 200 that is constructed in accordance with the principles of the present disclosure. The endoscope 200 includes a tunnel (or a lumen or channel) 80 where the hemoclips 100 are stored, wherein the tunnel has a distal portion where a hemoclip 100 is deployed and a proximal portion connected to, e.g., a handle. The tunnel 80 may have a circular or rectangular, or other suitably shaped cross section and be sized to fit hemoclips. In some examples, the tunnel 80 may be a long plastic tube that will contain multiple staples in line front-to-back. In some examples, the tunnel 80 may be sized to fit hemoclips 100 so that they remain in a collapsed or compressed configuration when inside the tunnel 80.

The endoscope 200 may include a set of metal gates 60 towards the distal portion of the tunnel 80 containing a spring 70 underneath the set of metal gates 60 to push them together and create a one-way valve. The endoscope may also include at least one firing mechanism 50 on opposing sides of each other inside the tunnel 80 for compressing the distal portions of the jaws of the hemoclips 100 and locking the securing latches 30 together, and an opening 82 at the distal portion of the tunnel 80 where the hemoclip 100 is deployed out of the endoscope 200.

Alternatively, a plastic, a steel, or any other material may be used instead of metal in the set of metal gates 60. Further, the tunnel may include, e.g., a plastic, a metal, a steel, a biocompatible material, and the like.

Deployment of Hemoclips

Figure 3:
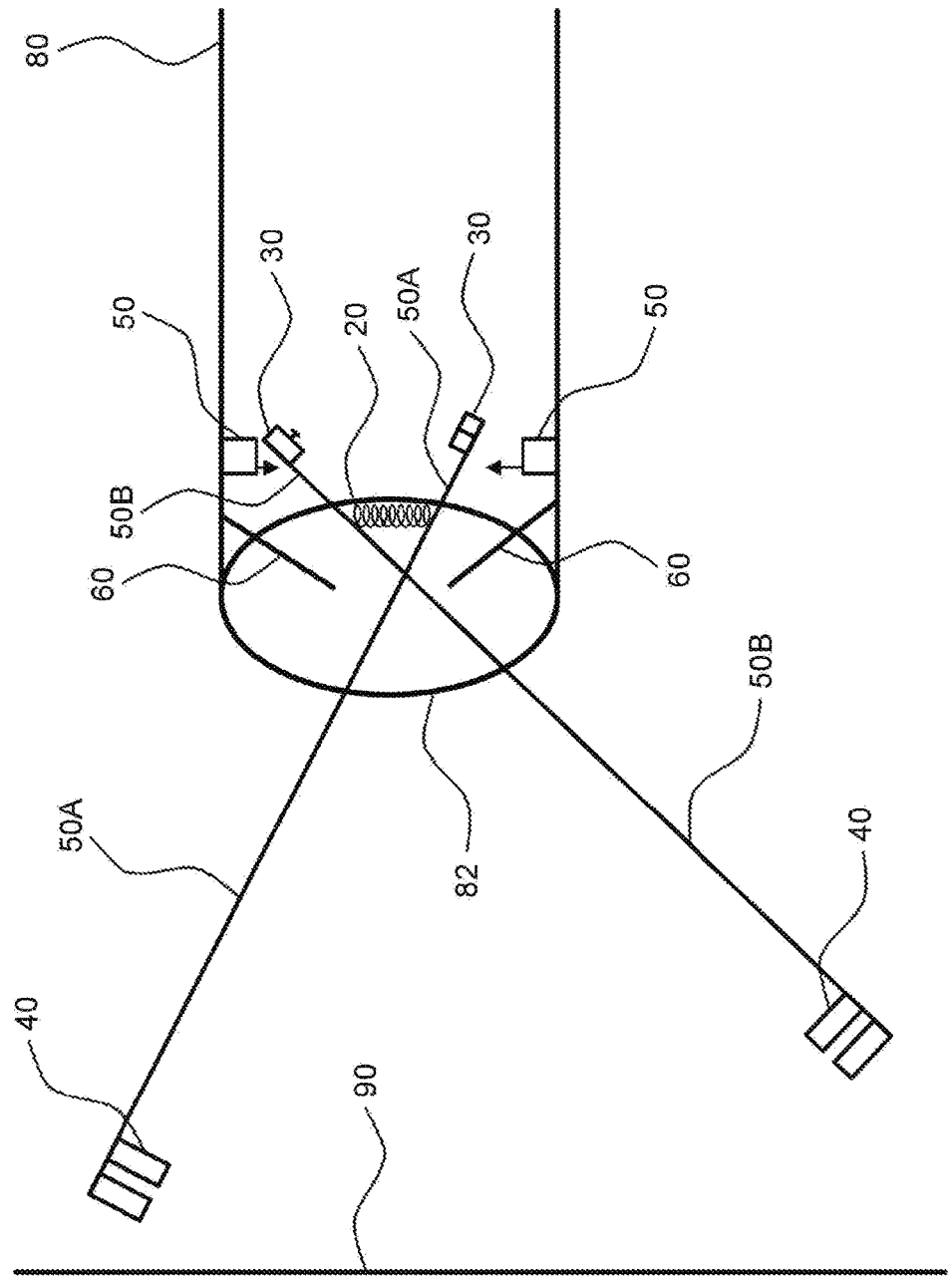
FIG. 3 illustrates an example of an endoscopic hemoclip being deployed through the distal end of the lumen of the endoscopic hemoclip device in accordance with one embodiment of the present disclosure.
Figure 4:
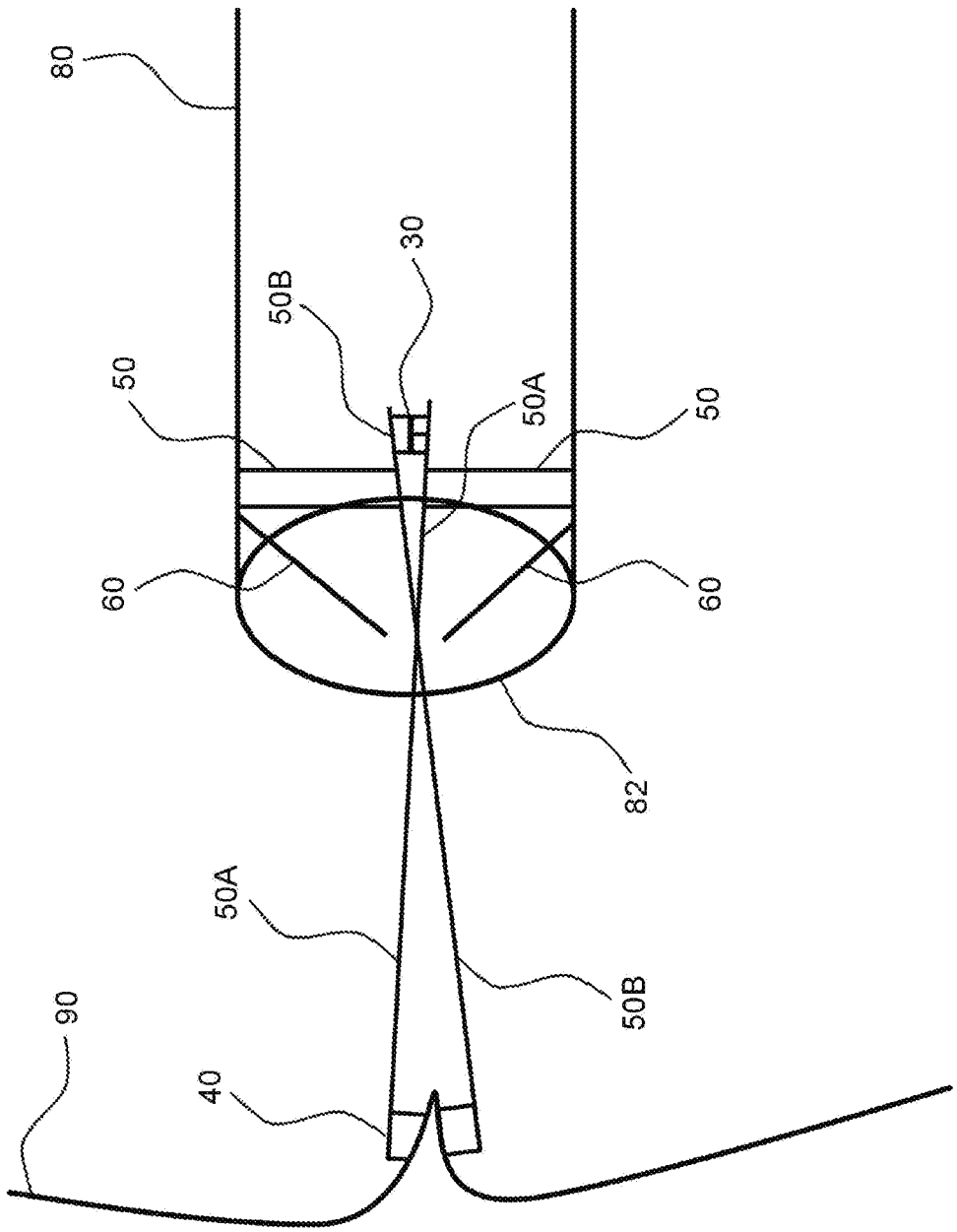
FIG. 4 illustrates an example of an endoscopic hemoclip clipping onto a patient's skin and being deployed through the distal end of the lumen of the endoscopic hemoclip device in accordance with one embodiment of the present disclosure.
Figure 5:
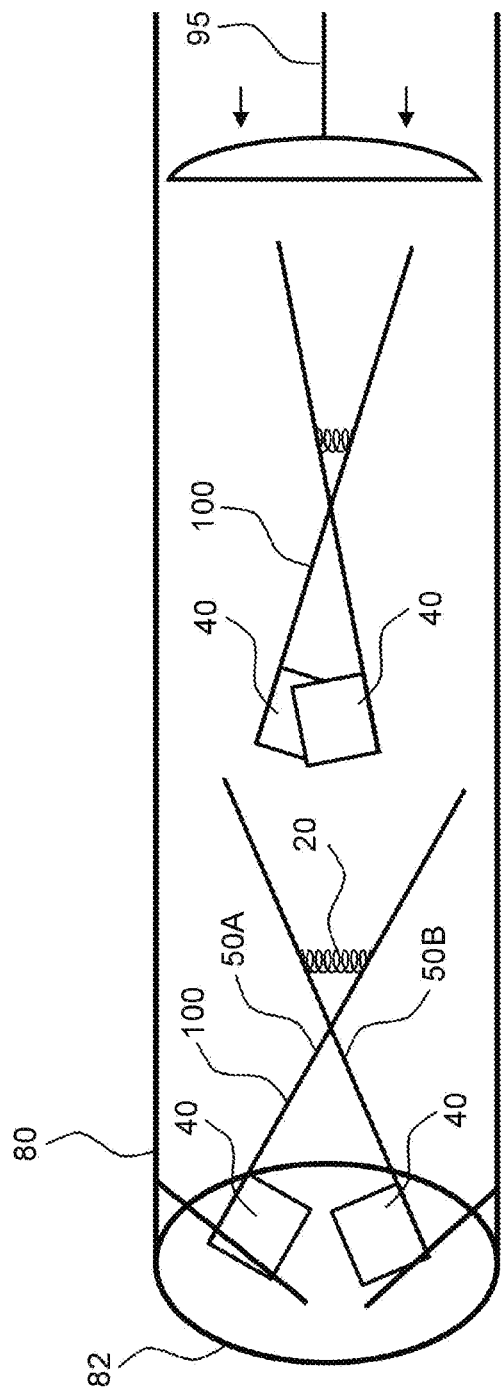
FIG. 5 illustrates an example of the endoscopic hemoclip device that is constructed in accordance with one embodiment of the present disclosure.

FIGS. 3-5 illustrate deployment of the hemoclips using the endoscopic hemoclip device. As illustrated, and referring to FIGS. 3-5 concurrently, a hemoclip 100 may be contained within an endoscope 200 and held in place by the set of gates 60. The set of gates 60 may be metal or other suitable materials and may be configured to open and close based on force (e.g., springs or other biasing mechanisms) such that it holds hemoclip 100 in place within the tunnel 80. The hemoclip 100, when not deployed, has a thinner profile due to the collapsibility provided by the pivot which allows it to fit through the set of gates 60. These gates function as a one-way valve to prevent clips from inadvertently falling backwards, as well as allow for stability needed for controlled application.

The hemoclip 100 may then be deployed by a pushing mechanism 95 (e.g., a plunger, bar, or other suitable device or mechanism) which would push the front half of one of the clips 100 out of the endoscope as shown in FIGS. 5 and 3. As the hemoclip 100 is pushed out of the tunnel 80, the set of metal gates are pushed open in a wider position and the spring 70 is compressed. After the hemoclip 100 is deployed, the spring 70 pushes the set of metal gates 60 back into its original position so that it can continue to hold additional hemoclips that are not yet deployed in place, thereby helping to facilitate storage and deployment of multiple hemoclips.

Once the front half of one of the hemoclips 100 is outside the gates 60, the spring mechanism 20 would push the jaws 40 open as they are no longer restrained by the tunnel 80. The clip 100 would still be held in position by the gates 60 because the proximal half of the clip 100 would be retained by the one-way valve gates 60 as shown in FIG. 3.

Next, the hemoclip would be deployed by compressing the back of the hemoclip 100 with the firing mechanism 50 and would be secured by closing the locking mechanism 30 on the hemoclip 100. If using the alternative design, the hemoclip 100 would be deployed after the spring holding the hemoclip 100 open is removed.

As shown in, e.g., FIG. 3, once the hemoclip 100 is deployed (via e.g., a catheter) as to encapsulate a desired target site 90, the firing mechanism 50 is activated (as shown in, e.g., FIG. 4) so that the hemoclip 100 is closed onto the target 90 and the latches 30 are locked onto each other. The firing mechanism 50 may include, e.g., a compressive force translated to the firing mechanism 50 (which may include pads, cleats, or other mechanical structures that compress the back of the hemoclip 100). The force may be translated through a string, a wire, an electrical signal, or other mechanism that would apply compressive force to both of the firing mechanisms 50 so that they compress the distal end of the hemoclip 100. Once the hemoclip 100 is locked onto the target 90, the closed hemoclip 100 has a thin enough profile to fit through the set of gates 60 (FIG. 4).

The tunnel 80 may include a suitable length to move onto a target site in vivo and may include a length that is proportionate to the scope being used. For example, a catheter/tunnel used for a gastroscope will be shorter than the length used for colonoscopies. The opening 82 of the tunnel 80 for deploying hemoclip 100 may include a diameter ranging, such as, for example, 2.8 mm for a standard gastroscope, 3.7 mm for a therapeutic gastroscope, 3.2 mm for a pediatric colonoscope, and 3.7 mm for an adult colonoscope. In an embodiment, the diameter may be greater than 3.7 mm and smaller than 3.7 mm.

Figure 6:
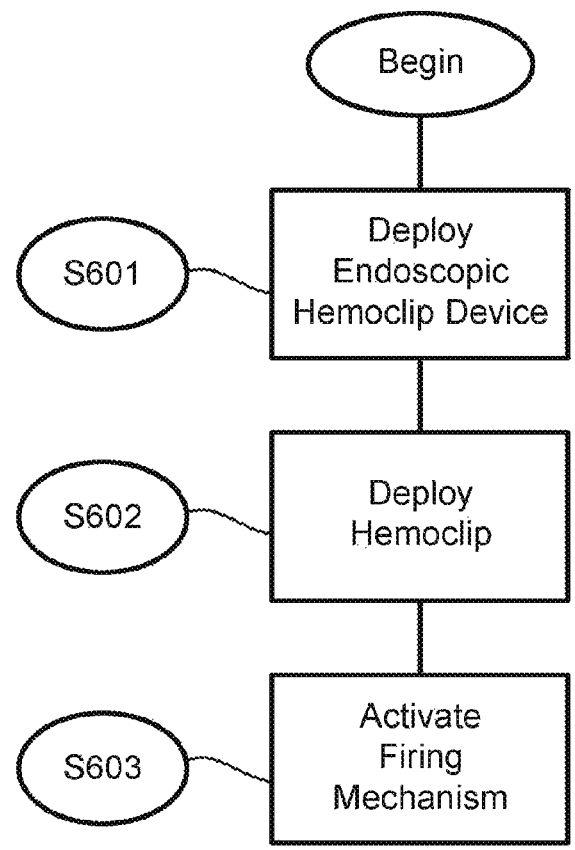
FIG. 6 illustrates an example of a method for deploying the endoscopic hemoclip device in vivo in accordance with one embodiment of the present disclosure.

FIG. 6 illustrates a method of deploying a hemoclip in succession during a surgical procedure, such as, for example, gastroenterology. The method includes deploying an endoscopic device inside the patient to a desired target site (S601); deploying a hemoclip out of the endoscopic device (S602); and activating a firing mechanism as to clamp the hemoclip onto the target site (S603). S602 may include pushing the hemoclip out of the endoscopic device via, e.g., a syringe.

The endoscopic hemoclip device 150 may be assembled in various methods. In some embodiments, the hemoclip 100 and the endoscope 200 may be made of biocompatible or other suitable materials.

SELECTED EMBODIMENTS

Although the above description and the attached claims disclose a number of embodiments of the present invention, other alternative aspects of the invention are disclosed in the following further embodiments.

Embodiment 1. An endoscopic device for deploying a hemoclip onto a desired target, the device comprising: a hemoclip; and an endoscope that is configured to store and deploy the hemoclip, wherein the hemoclip comprises (a) a first jaw and a second jaw that intersect with one another as to form an X-shape with a pivot in a center where the first and the second jaw intersect, and (b) a proximal portion configured to face the desired target and a distal portion facing inward towards the endoscope, and wherein the endoscope comprises a proximal portion having an opening where the hemoclip is deployed and a distal portion connected to a handle.

Embodiment 2. The endoscopic device of embodiment 1, wherein the hemoclip comprises a set of teeth on opposing surfaces of the first jaw and the second jaw that face each other.

Embodiment 3. The endoscopic device of embodiment 2, wherein the set of teeth are configured to lock onto the desired target.

Embodiment 4. The endoscopic device of embodiment 2, wherein the set of teeth are located on the proximal portion of the hemoclip.

Embodiment 5. The endoscopic device of embodiment 1, wherein the hemoclip further comprises a spring located behind the pivot closer to the distal portion of the hemoclip.

Embodiment 6. The endoscopic device of embodiment 3, wherein the hemoclip further comprises a set of latches on opposing sides facing each other on the distal portion of the hemoclip, wherein the set of latches are configured to lock onto each other thereby locking the set of teeth onto the desired target.

Embodiment 7. The endoscopic device of embodiment 6, wherein the set of latches comprises a nail and a corresponding hole to lock in the set of latches onto each other.

Embodiment 8. The endoscopic device of embodiment 6, wherein the set of latches are configured to lock onto each other via at least the following means: a screw, an adhesive, and other locking mechanisms.

Embodiment 9. The endoscopic device of embodiment 6, wherein the endoscope comprises an internal tunnel where the hemoclip is stored and deployed.

Embodiment 10. The endoscopic device of embodiment 9, wherein the tunnel comprises a proximal end where the hemoclip is deployed.

Embodiment 11. The endoscopic device of embodiment 10, wherein the tunnel comprises a distal end that is configured to be connected to a handle.

Embodiment 12. The endoscopic device of embodiment 10, wherein the tunnel comprises a set of metal gates located near or at the proximal end of the endoscope that is configured to hold the hemoclip in place within the endoscope.

Embodiment 13. The endoscopic device of embodiment 12, wherein the tunnel comprises at least one firing mechanism located on opposing sides of each other inside the tunnel towards the distal end of the tunnel.

Embodiment 14. The endoscopic device of embodiment 10, wherein the endoscope comprises a hole at the proximal end of the endoscope where the hemoclip can be deployed out of the endoscope.

Embodiment 15. The endoscopic device of embodiment 12, wherein the at least one firing mechanism is activated to close the set of latches onto each other.

Embodiment 16. The endoscopic device of embodiment 12, wherein the set of metal gates are configured to open and close based on force exerted by the hemoclip as the hemoclip is pushed out of the tunnel.

Embodiment 17. A method of deploying a hemoclip inside a patient, the method comprising: deploying an endoscopic hemoclip device having an endoscope and a hemoclip inside the patient, wherein the hemoclip is configured to be stored in and deployed from the endoscope; guiding the endoscopic hemoclip device onto a desired target inside the patient; deploying the hemoclip out of the endoscope as to encapsulate the desired target; and activating a firing mechanism inside the endoscope to clamp the hemoclip onto the desired target.

Embodiment 18. The method of embodiment 17, wherein the firing mechanism comprises the proximal end of the hemoclip.

Embodiment 19. The method of embodiment 17, wherein the hemoclip has a set of jaws that are connected around a pivot joint.

Embodiment 20. The method of embodiment 17, wherein deploying the hemoclip out of the endoscope further comprises deploying the hemoclip halfway out of the endoscope so that a spring on the distal end of the hemoclip causes a set of jaws on the hemoclip to open.

CONCLUSION

The various methods and techniques described above provide a number of ways to carry out the disclosure. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the disclosure has been disclosed in the context of certain embodiments and examples, it will be understood by those skilled in the art that the embodiments of the disclosure extend beyond the specifically disclosed embodiments to other alternative embodiments and/or uses and modifications and equivalents thereof.

In some embodiments, the terms "a" and "an" and "the" and similar references used in the context of describing a particular embodiment of the disclosure (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Certain embodiments of this disclosure are described herein. Variations on those embodiments will become apparent to those of ordinary skill in the art upon reading the foregoing description. It is contemplated that skilled artisans can employ such variations as appropriate, and the disclosure can be practiced otherwise than specifically described herein. Accordingly, many embodiments of this disclosure include all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the disclosure disclosed herein are illustrative of the principles of the embodiments of the disclosure. Other modifications that can be employed can be within the scope of the disclosure. Thus, by way of example, but not of limitation, alternative configurations of the embodiments of the disclosure can be utilized in accordance with the teachings herein. Accordingly, embodiments of the present disclosure are not limited to that precisely as shown and described.

What is claimed is:

1. An endoscopic device for deploying a hemoclip onto a desired target, the device comprising:
   at least one hemoclip comprising a first jaw and a second jaw that intersect at a pivot joint to form an X-shape, the pivot joint including a joint with one axis of rotation;
   a spring located behind the pivot joint and in between the first jaw and the second jaw, one end of the spring contacting the first jaw and another end of the spring contacting the second jaw such that the spring contacts both the first and second jaws; and
   an endoscope comprising a channel sized for the at least one hemoclip and a distal portion having an opening connected to the channel where the at least one hemoclip is deployed,
   wherein:
   the at least one hemoclip is configured to be in an open position or in a closed position, and ends of the first jaw do not contact ends of the second jaw in the open position,
   the at least one hemoclip is in a compressed X-shape when not deployed from the endoscope and is capable of being in an expanded X-shape when deployed from the endoscope; and
   the at least one hemoclip has a proximal portion facing a target site and a distal portion facing inward towards the endoscope.

2. The endoscopic device of claim 1, wherein the hemoclip comprises a set of teeth on opposing surfaces of the first jaw and the second jaw that face each other.

3. The endoscopic device of claim 2, wherein the set of teeth are configured to lock onto the desired target.

4. The endoscopic device of claim 2, wherein the set of teeth are located on the proximal portion of the hemoclip.

5. The endoscopic device of claim 1, wherein:
   proximal portions of the first and second jaws are configured to clamp onto the target site; and
   the spring is configured to bias the first and second jaws in the open position as the first and second jaws are deployed out of the endoscope.

6. The endoscopic device of claim 4, wherein the hemoclip further comprises a set of latches on opposing sides facing each other on a distal end of the hemoclip, wherein the set of latches are configured to lock onto each other thereby locking the set of teeth onto the desired target.

7. The endoscopic device of claim 6, wherein the set of latches comprises a nail and a corresponding hole to lock in the set of latches onto each other.

8. The endoscopic device of claim 6, wherein the set of latches are configured to lock onto each other via at least one of the following: a screw, an adhesive, and other locking mechanisms.

9. The endoscopic device of claim 6, wherein the channel comprises an internal tunnel where the hemoclip is stored and deployed.

10. The endoscopic device of claim 9, wherein the tunnel comprises a distal end where the hemoclip is deployed.

11. The endoscopic device of claim 10, wherein the tunnel comprises a proximal end that is configured to be connected to a handle.

12. The endoscopic device of claim 10, wherein the tunnel comprises a set of metal gates located near or at a distal end of the endoscope that is configured to hold the hemoclip in place within the endoscope.

13. The endoscopic device of claim 12, wherein the tunnel comprises at least one firing mechanism located on opposing sides of each other inside the tunnel towards the distal end of the tunnel.

14. The endoscopic device of claim 10, wherein the hemoclip is configured to be deployed out of the endoscope at the opening at a distal end of the endoscope.

15. The endoscopic device of claim 13, wherein the at least one firing mechanism is activated to close the set of latches onto each other.

16. The endoscopic device of claim 12, wherein the set of metal gates are configured to open and close based on force exerted by the hemoclip as the hemoclip is pushed out of the tunnel.

17. The endoscopic device of claim 1, wherein the spring remains in between the first jaw and the second jaw when the at least one hemoclip is in the compressed X-shape and when the at least one hemoclip is in the expanded X-shape.

18. A method of deploying a hemoclip inside a patient, the method comprising:
   deploying an endoscope inside the patient, wherein the endoscope comprises an at least one hemoclip inside a channel, wherein the at least one hemoclip comprises a first jaw and a second jaw that intersect at a pivot joint to form an X-shape, the pivot joint including a joint with one axis of rotation, and a spring located behind the pivot joint between the first jaw and the second jaw, one end of the spring contacting the first jaw and another end of the spring contacting the second jaw such that the spring contacts both the first and second jaws, wherein the at least one hemoclip is configured to be in an open position or in a closed position, and ends of the first jaw do not contact ends of the second jaw in the open position, and wherein the at least one hemoclip is configured to be stored in and deployed from the endoscope;

guiding the endoscope to a desired target inside the patient such that a proximal portion of the at least one hemoclip faces the desired target and a distal portion of the at least one hemoclip faces inward towards the channel of the endoscope;

deploying the at least one hemoclip out of the endoscope as to encapsulate the desired target, wherein the first jaw and the second jaw are configured to be spread open in the open position as the at least one hemoclip is deployed from the endoscope, wherein the spring is configured to bias the first and second jaws in the open position as the first and second jaws are deployed out of the endoscope; and activating a firing mechanism inside the endoscope to clamp the at least one hemoclip onto the desired target, wherein the proximal portion of the at least one hemoclip comprise a set of teeth on opposing surfaces of the first jaw and the second jaw that face each other, and the set of teeth located on proximal portions of the first and second jaws are configured to clamp onto the desired target.

19. The method of claim 18, wherein the firing mechanism is located on opposing sides of each other inside the channel for compressing the distal portions of the first and second jaws of the at least one hemoclip.

20. The method of claim 18, wherein the at least one hemoclip is in a compressed X-shape when not deployed from the endoscope and is capable of being in an expanded X-shape when deployed from the endoscope.

21. The method of claim 18, wherein deploying the at least one hemoclip out of the endoscope comprises deploying the at least one hemoclip halfway out of the endoscope so that the spring located closer to the distal portion of the at least one hemoclip than to the proximal portion of the at least one hemoclip causes the first and second jaws on the at least one hemoclip to open.

\* \* \* \* \*